March 4, 1969   JEAN-JACQUES JOSEPH   3,431,017

CONTAINER TRUCK LOCKING MECHANISM

Filed Nov. 13, 1967   Sheet 1 of 2

INVENTOR
JEAN-JACQUES JOSEPH
BY
KARL RATH
ATTORNEY

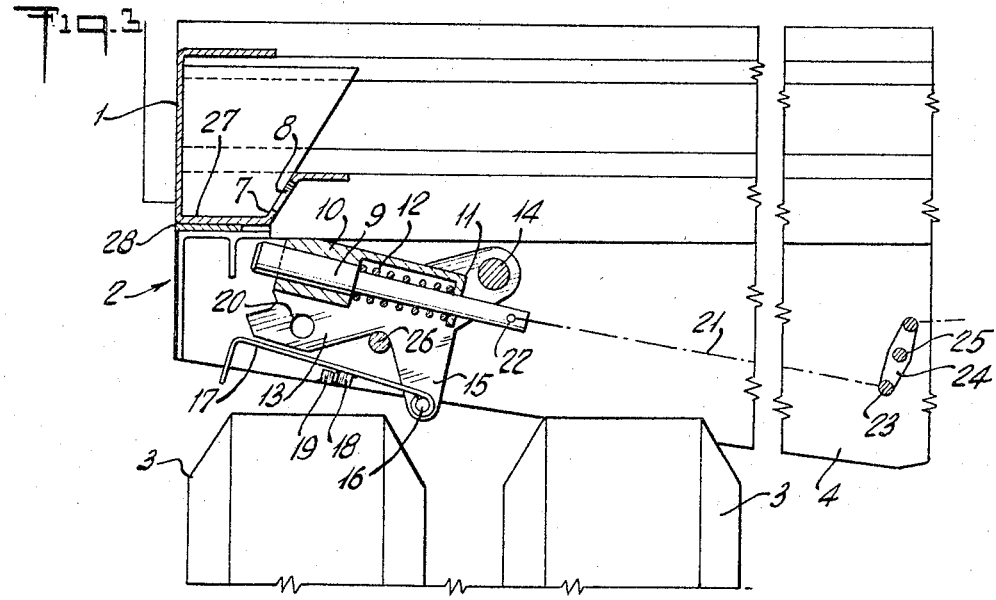
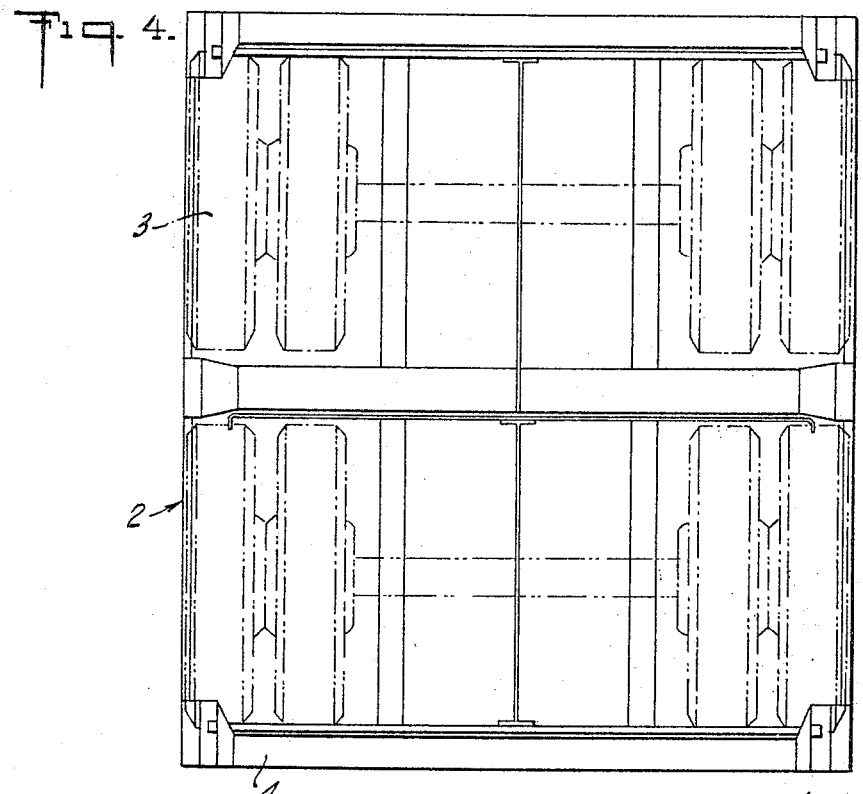

United States Patent Office 3,431,017
Patented Mar. 4, 1969

3,431,017
CONTAINER TRUCK LOCKING MECHANISM
Jean-Jacques Joseph, Paris, France, assignor to Frangeco, Societe Anonyme Francaise, Puteaux, Hauts-de-Seine, France, a corporation of France
Filed Nov. 13, 1967, Ser. No. 681,994
Claims priority, application France, Nov. 10, 1966, 83,178
U.S. Cl. 296—35                                                6 Claims
Int. Cl. B62d 33/02; B60p 7/08; B61d 45/00

ABSTRACT OF THE DISCLOSURE

A container truck comprising a truck unit having an upper plane surface and a container unit having a bottom surface for engagement with said first surface in the loaded position is fitted with retractable locking means. The locking device comprises essentially a perforate locking plate fast on and extending inwardly at predetermined incline angle from the bottom surface of the container, and a cooperating locking mechanism upon the truck comprised of a pivotally mounted support and an operating lever therefor, to operate the same between a retracted or inoperative position below the surface of the truck and an operative position of projection beyond said surface. Sliding mounted upon said support is a locking bolt fitted with spring means, to urge the same, in the operative position of the support, into locking engagement with a perforation of said plate, to firmly connect and lock said units.

---

The present invention relates to container trucks as used in combined rail-road transport or shipments, more particularly to an improved coupling mechanism for the coupling of a container unit with a truck unit during transport and for the temporary disconnection or decoupling of the units during the loading and unloading operations of the containers to and from a railroad car or the like, respectively.

Methods of alternate shipment by rail and truck are well known according to which a shipping container or part-trailer is coupled, upon its unloading from a railroad car or the like, with a road truck having pneumatic tires for transport by road, and vice versa. For this purpose, suitable releasable coupling means are required, to temporarily disconnect or unlock the container and truck units during the carrying out of a loading and unloading operation.

In complying with existing requirements, it has been customary, in order to avoid the presence of projecting parts upon the lower or bottom surface of the containers, or generally to keep the containers as simple as possible, to mount the main locking mechanism upon the chassis of the truck unit. Arrangements of this type, while facilitating the loading and unloading operations of the containers, have however not been fully satisfactory, since the locking devices, which now necessarily project from the upper truck surface or platform, have been found to present other difficulties and inconveniences during the loading and unloading of the containers, such for instance where the truck has to be moved to a position below the container after the latter has been partially disengaged from the railroad car or the like unloading platform. In this case, the projecting locking mechanism upon the truck may make it necessary to lift the free or disengaged end of the container or, if possible, to lower the chassis of the truck, such for example by deflating its tires, to obtain the same effect. In either case, the unloading operations may be both complicated and unduly prolonged, aside from other difficulties and shortcomings readily understood by those skilled in the art.

Accordingly, an important object of the present invention is the provision of improved releasable coupling mechanism for a container-truck unit of the referred to type by which the foregoing and related drawbacks and difficulties are substantially eliminated.

A more specific object of the invention is the provision of a retractable locking mechanism including a slidable locking bolt and mounted upon a truck unit, said mechanism projecting normally, that is, during the coupled position of the units, beyond the upper surface or platform of the truck unit for cooperation with a perforate locking plate or the like mounted upon the container unit, and said mechanism being designed for retraction, by the aid of suitable operating means, below said platform, to facilitate loading and unloading of the containers.

Still another object of the invention is the provision of retractable locking mechanism for a container-truck unit of the referred to type which may be operated between its inoperative or retracted position and its operative position expeditiously and either manually or by the aid of suitable electrical, pneumatic or the like operating means.

The invention, both as to foregoing and ancillary objects as well as novel aspects thereof, will be better understood from the following detailed description, taken in conjunction with the accompanying drawings forming part of this specification and in which.

Figure 1:
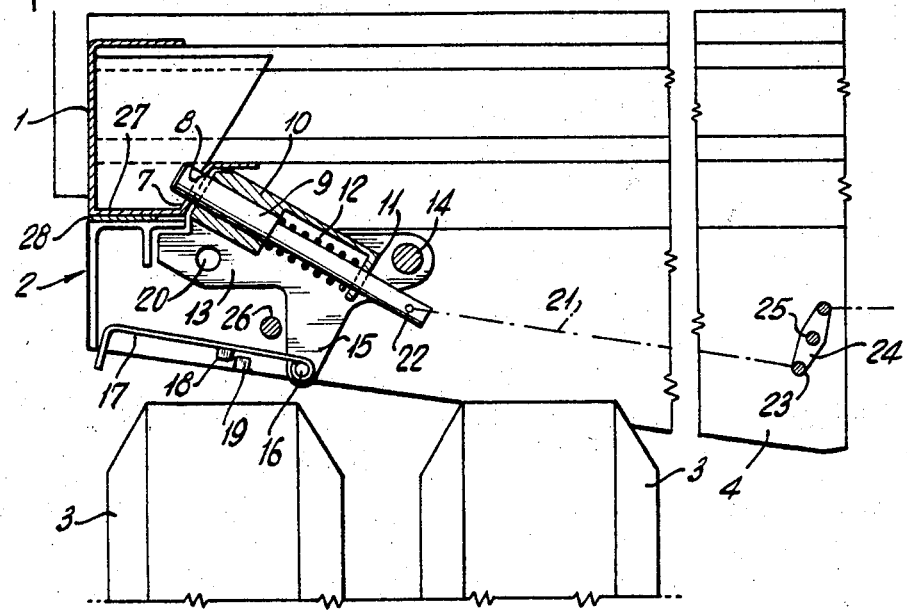
FIG. 1 is a partial vertical transverse cross-sectional view of a container-truck unit embodying locking mechanism constructed in accordance with the principles of the invention, the parts of said mechanism being shown in the locked or coupled position of the units.

FIG. 3, also being a similar view to FIG. 1, shows the locking mechanism in the inoperative or retracted position; and FIG. 4 is a plan view, shown on a reduced scale, of the truck unit of the preceding figures.

Like reference numerals denote like parts in the different views of the drawings.

Referring more particularly to the drawings, the numeral 1 represents one of the side beams or members of a container unit and 2 shows the chassis of a road truck or unit equipped, in the example shown, with pneumatic twin tires 3. Item 4 indicates one of the cross beams or members connecting the side beams of the chassis 2 and being in registry with the members of the container in the coupled position of the units.

The side members 1 are either formed with or carry perforate and inturned bolting plates 7 extending from the lower or bottom surface of the container at a predetermined incline angle, said plates forming one of the cooperating component parts of the locking mechanism and provided for this purpose with holes or perforations 8, or rows of perforations in the case of a multiple locking arrangement. The perforations 8 are adapted for engagement by the locking bolts 9 of the cooperating locking mechanism mounted upon the truck unit or chassis 2 and constructed in the manner described in the following.

While more than a single locking device will be provided in practice, only a single device will be referred to and described in the following.

More particularly, the locking device shown comprises a guide sleeve 10 slidably supporting the bolt 9 and fitted with an abutment or base 11 for the mounting of a coiled biasing spring 12, to urge the bolt 9 in a direction so as to project beyond the open end of the sleeve 10. The latter is secured to or integral with a retractable plate-like support 13 pivotally mounted upon the member 4 of the chassis 2 about an axis 14, the latter extending in the lengthwise direction of the truck or container, respectively. Support 13 has a depending ear or projection 15 to the extreme end of which is jointed, as at 16, an operating and locking lever 17 carrying a depending stop 18 for cooperation with a stationary abutment upon the member 4.

Figure 2:
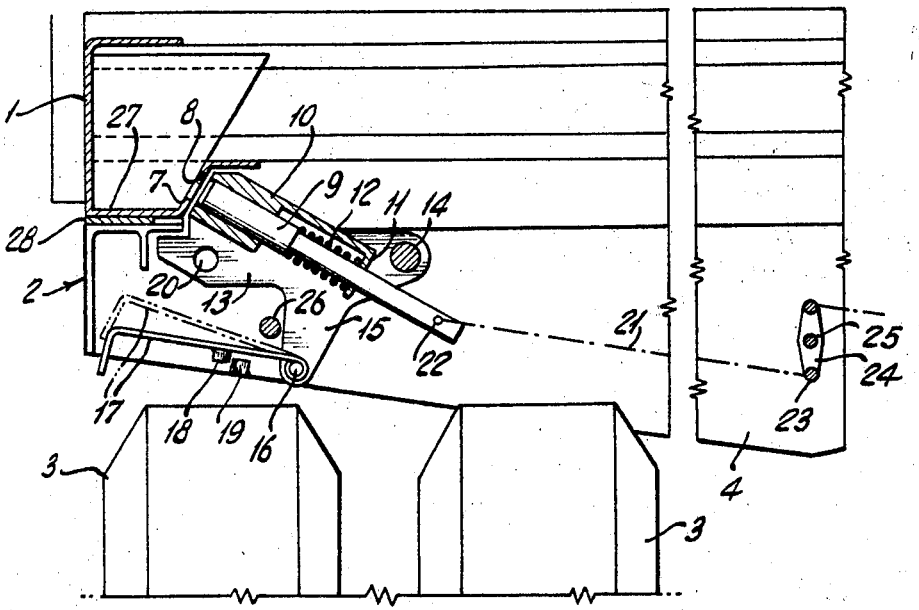
FIG. 2 is a view similar to FIG. 1 with the parts being shown in the disengaged or unlocking position of the mechanism.

Furthermore, according to the invention, the guide sleeve 10 is inclined, in the operative or locking position of the device as shown by FIGS. 1 and 2, at such an angle as to cause its extreme end to conform with the incline angle of the plate 7 and to engage and act as a guide for the latter.

FIG. 1 shows the parts of the locking mechanism in the operative or coupling position of the truck and container units. The support plate 13 is designed or pivoted in such a manner as to normally urge it, by virtue of its own weight or gravity, into a downward position by rotation about its axis 14 in anticlockwise direction. This rotation is limited in the position according to FIG. 1, by the stop 18 of the lever 17 engaging the stationary abutment 19. Furthermore, in the locking position according to FIG. 1, the bolt 9 is urged, under the action of the spring 12, to engage the perforation 8 in the plate 7 forming part of the container or member 1, whereby to firmly lock the container with the truck. A further bore or perforation 20 in the support 13, being in registry with a similar bore in the member 4, additionally serves to secure the coupled parts by means of a locking pin or the like inserted in said bores.

As a consequence, all that is required, in order to disconnect or decouple the container from the truck, is to retract the bolt 9 against the action of the spring 12 by the aid of a suitable operating device or mechanism shown in the form of a linkage mechanism indicated schematically in the drawing. The latter comprises essentially a connecting rod 21 jointed at one end, as at 22, to the bolt 9, and jointed at its opposite end, as at 23, to one end of a double-arm control lever 24 being pivotally mounted upon the member 4 of the chassis 2 about an axis 25. FIGS. 2 and 3 show the retracted position of the lever 24 and bolt 9, respectively, whereby to allow of ready separation of the units.

During the loading and unloading maneuvers and, especially, during moving or positioning of the container, or positioning of the truck, respectively, the support 13 is retracted from its operative position, FIG. 1, to its inoperative position, FIG. 3, that is flush with or below the upper surface of the truck, or free from any parts projecting beyond said surface. For the latter purpose, the locking pin is first removed from the perforation 20, whereupon the operating lever 17, FIG. 1, is slightly lifted, to disengage the stop 18 from the abutment 19. The lever 17 is then pushed in the inward direction to allow the support 13 to rotate about its pivot 14 by the action of gravity until disappearing within or below the upper surface of the truck, as shown in FIG. 3. This retracted position is fixed or limited by the further stop 26 upon the member 4 cooperating with the support 13.

Coupling or locking of the container unit with the truck in the reverse direction is effected as follows. With the locking device being in the retracted position as shown by FIG. 3, the truck is brought below the container in the course of a loading operation, whereupon the operator lifts and pulls the lever 17 in the outward direction, to operate the support 13 to its operative position of projection above the upper surface of the truck, as shown by FIG. 2. In this position, being secured by the stop 18 now engaging the opposite side of the stationary abutment 19, the oblique end of the guide sleeve 10 being parallel to the locking plate 7 on the container acts to facilitate the positioning or centering of the truck during the descent of the container in the course of a loading operation. In this position, the lower surface 27 of the container engages suitable antifriction linings 28 applied to the top surface of the truck 2. The operating lever 24 is then rotated manually in the proper direction, to cause the bolt 9 to engage the plate 7 by the action of the spring 12. The truck is then shifted or displaced below the container until the bolt 9 registers with the perforation 8 of the plate 7, in which position the parts are engaged with one another by the action of the spring 9, to effect coupling or locking with the locking force acting in both the horizontal and vertical directions due to the inclination of the bolt 9. After insertion of the locking pin in the bore 20, the truck is ready for road transport.

Although only a single locking device has been shown and described, it is understood that a number of devices may be provided arranged in rows or arrays on both sides of the truck and cooperating with a pair of locking plates disposed upon the container.

I claim:
1. In a container truck comprising a truck unit having an upper surface and a container unit having a bottom surface for engagement with said first surface in the loaded position, locking means for said unit comprising in combination:
   (1) a perforate locking plate fast on said container unit and extending inwardly and at a predetermined incline angle from said bottom surface, and
   (2) a cooperating locking mechanism upon said truck unit comprised of
      (a) a support pivotally mounted upon said truck unit and operating means therefor, to operate the same between a retracted position below the upper surface of the truck unit and an operative position of projection above said surface,
      (b) a locking bolt slidably mounted upon said support and fitted with resilient biasing means, to urge the same into locking engagement with said plate in the operative position of said support, to lock said units together, and
      (c) means to temporarily retract said bolt against the action of said resilient means, to unlock said units and to enable operation of said support to its retracted position.

2. In container truck locking means as claimed in claim 1, support arranged to be normally urged to its retracted position by gravity, and releasable locking means to retain said support in its operative position.

3. In container truck locking means as claimed in claim 1, said support being arranged to be normally urged to its retracted position by gravity and said operating means being comprised of a lever having one end jointed to said support, for operating said support from the retracted to the operative position, and vice versa, by pulling and pushing, respectively, of said lever, and a stop upon said lever cooperating with an abutment upon said truck unit, to lock said support in the operative position and to enable unlocking thereof by lifting said lever.

4. In container truck locking means as claimed in claim 1, said last means being comprised of linkage mechanism having one end jointed to said bolt and having its remaining end jointed to a control lever pivotally mounted upon said truck unit.

5. In container truck locking means as claimed in claim 1, said bolt being mounted in a guide sleeve fast upon said support and arranged with its end surface in the operative position of said support assuming an angle conforming with the incline angle of said locking plate.

6. In container truck locking means comprising an array of locking mechanisms according to claim 1 mounted upon said truck unit and cooperating with a common locking plate mounted upon said container unit.

(References on following page)

References Cited

UNITED STATES PATENTS

| | | | |
|---|---|---|---|
| 2,539,201 | 1/1951 | Pasko | 296—35 |
| 2,898,872 | 8/1959 | Hastings | 105—366 |
| 3,034,825 | 5/1962 | Harlander et al. | 296—35 |
| 3,158,106 | 11/1964 | Clejan | 105—366 |

BENJAMIN HERSH, *Primary Examiner.*

L. D. MORRIS, JR., *Assistant Examiner.*

U.S. Cl. X.R.

105—366